United States Patent
Linsbauer

(10) Patent No.: US 6,220,417 B1
(45) Date of Patent: Apr. 24, 2001

(54) CLUTCH CUP

(75) Inventor: Peter Linsbauer, Remshalden (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/129,398

(22) Filed: Aug. 5, 1998

(30) Foreign Application Priority Data

Aug. 5, 1997 (DE) .......................................... 297 13 920 U

(51) Int. Cl.⁷ ..................................................... F16D 43/24
(52) U.S. Cl. ................... 192/76; 192/105 BA; 384/439; 403/279
(58) Field of Search .................... 192/105 R, 105 BA, 192/105 CD, 70.16, 76; 403/274, 279, 281; 29/521, 505; 384/439

(56) References Cited

U.S. PATENT DOCUMENTS

| | | | |
|---|---|---|---|
| 3,635,529 | * | 1/1972 | Nass ......................................... 29/521 |
| 3,954,311 | * | 5/1976 | Pike ....................................... 384/439 |
| 4,984,669 | * | 1/1991 | Hoffman ........................... 192/105 R |
| 5,845,757 | * | 12/1998 | Csonka ........................... 192/105 BA |

\* cited by examiner

*Primary Examiner*—David A. Bucci
*Assistant Examiner*—William C. Joyce
(74) *Attorney, Agent, or Firm*—Robert W. Becker & Associates

(57) ABSTRACT

A clutch cup for a centrifugal clutch of a hand-held working tool, driven by an internal combustion engine, has a clutch drum and a hub coaxially fastened to the clutch drum. A bearing bushing is arranged in the hub and fastened to the hub by a frictional and positive-locking connection. A receiving member is coaxially fastened to the hub and receives the drive shaft for driving the tool.

10 Claims, 2 Drawing Sheets

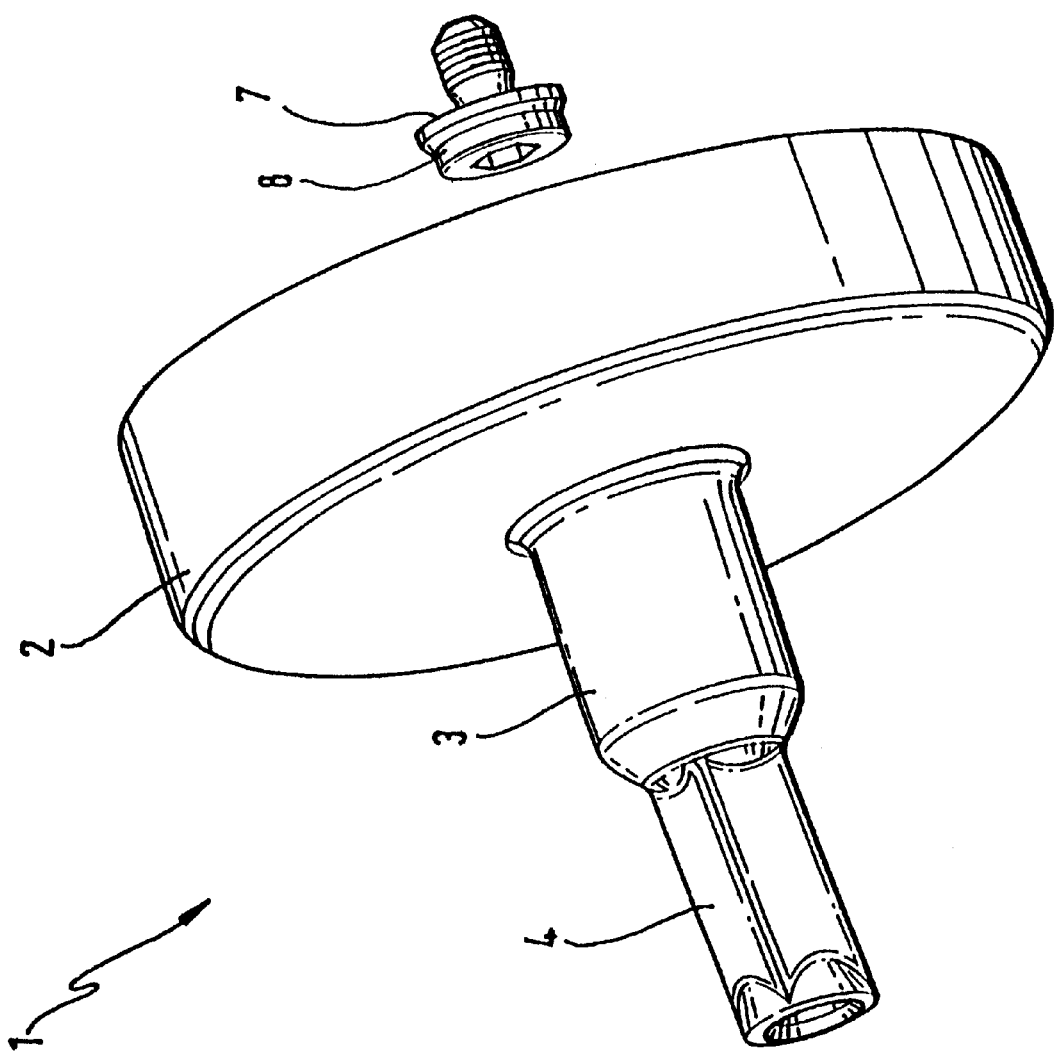

CLUTCH CUP

BACKGROUND OF THE INVENTION

The present invention relates to a clutch cup for a centrifugal clutch of a hand-held working tool, especially a trimmer, driven by an internal combustion engine whereby the clutch cup is comprised of a clutch drum, a hub coaxially fastened thereto with a bearing bushing arranged therein and with a coaxially fastened receiving element for receiving the end of a drive shaft.

Hand-held working tools driven by a internal combustion engine often include a centrifugal clutch by which the driven working tool at low rpm of the internal combustion engine is turned off and with increasing rpm is automatically switched on due to the centrifugal forces. Thus, the operation of the working tool is simplified and operational safety increased.

In hand-held working tools, especially trimmers, the centrifugal member of the centrifugal clutch is fixedly connected to the crank shaft of the combustion engine while the clutch cup that encloses the centrifugal member is rotatably supported on the crankshaft end in a bearing bushing or in a separate clutch housing.

In the case of support on the crankshaft, the bearing bushing is inserted into the hub of the clutch cup. The connection bearing bushing/hub is mechanically greatly stressed so that securing against loosening and axial movement of the bearing bushing is required.

In order to axially secure the bearing bushing in the hub, the inner side of the clutch drum is provided with a disc welded thereto having an inner diameter that is slightly smaller than the outer diameter of the bearing bushing. This type of axial securing is complicated because an additional part and a welding connection as well as an additional working step are required.

It is therefore an object of the present invention to provide a reliable and inexpensive axial securing of a bearing bushing inserted into the hub of the clutch cup of a centrifugal clutch.

SUMMARY OF THE INVENTION

The clutch cup for a centrifugal clutch of a hand-held working tool according to the present invention is primarily characterized by:
 a clutch drum;
 a hub coaxially fastened to the clutch drum;
 a bearing bushing arranged in the hub and fastened to the hub by a frictional and positive-locking connection;
 a receiving member, coaxially fastened to the hub, for receiving the drive shaft.

The combined use of a frictional and positive-locking connection provides a maximum of positioning securing action of the bearing bushing.

By providing radially extending, circumferentially arranged impressions at the hub that are pressed into the bearing bushing for realizing the positive-locking connection, a very effective and very secure axial securing action is provided. Furthermore, this type of securing is inexpensive because there is no need for additional parts or a welding connection with additional working steps.

The wide range of possible shapes and positioning of the impressions at the hub allow for an adaptation to respective manufacturing specifications and application requirements of the different types of hand-held working tools.

It is advantageous to use the pressing device for the bearing bushing also for the pressing step for providing the impressions. The pressing device thus serves as a pressure relief device thus ensuring the shape stability of the hub, especially when the impressions are provided in pairs on opposite sides of the hub and when the bearing bushing is supported by a calibrating mandril. It may be expedient to arrange a plurality of impressions over the circumference so as to be staggered by an angular distance of 120°.

When the clutch drum, the hub, and the receiving member are provided as a monolithic (unitary) deep-drawn part, considerable cost savings are achieved. The redressing as well as calibration option provided by the redressing device and calibrating device of the pressing device increases the service life and improves running trueness of the hand-held working tool.

BRIEF DESCRIPTION OF THE DRAWINGS

The object and advantages of the present invention will appear more clearly from the following specification in conjunction with the accompanying drawings, in which:

FIG. 3 shows the clutch cup with screw and bearing bushing in a perspective exploded view.

DESCRIPTION OF PREFERRED EMBODIMENTS

The present invention will now be described in detail with the aid of several specific embodiments utilizing FIGS. 1 through 3.

Figure 1:
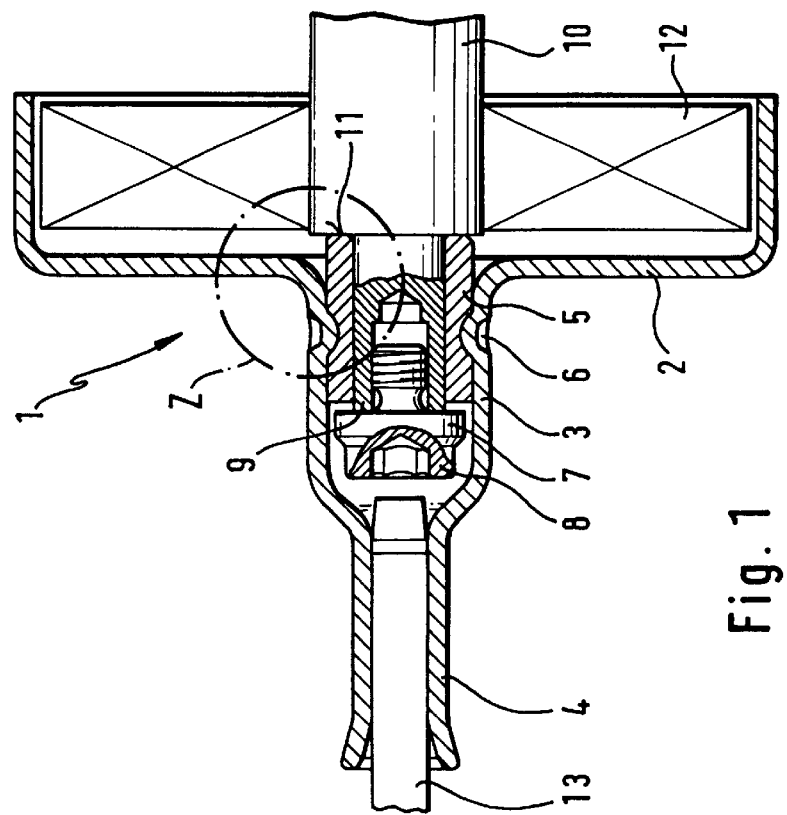
FIG. 1 shows a section of the clutch cup with clutch drum, hub, receiving element as well as centrifugal member.

FIG. 1 shows a section of the clutch cup 1 with a clutch drum 2, a hub 3, and a receiving member 4. The clutch cup 1 is a unitary or monolithic deep-drawn part so that the manufacturing costs are considerably reduced.

A bearing bushing 5 is pressed-fitted into the hub 3 and thus fixed in its position. It is additionally axially secured by impressions 6 which are pressed in the form of depressions into the circumference of the hub 3 and thus at the same time penetrate into the bearing bushing 5. This provides in addition to the frictional connection a positive-locking connection of the bearing bushing 5 in the hub 3. By positioning the impressions 6 on opposite sides of the hub 3, and by providing a calibrating mandril M (see FIG. 2) during the pressing step for pressing the bearing bushing 5 into the hub 3, the bearing bushing 5 as well as the hub 3 are pressure-relieved and supported so that their shape is maintained.

The bearing bushing 5 is positioned on the coupling end 9 of the crankshaft 10 of the combustion engine. A disc 7 having an outer diameter that is smaller than the outer diameter of the bearing bushing 5 is threaded by a screw 8, which is a unitary part of the disc 7, into the coupling end 9 of the crankshaft 10. The screw 8 which is expediently in the form of a hexagon socket head screw, is inserted into the hub 3 before the bearing bushing 5 is pressed-fitted into the hub 3. When mounting the clutch cup 1 onto the coupling end 9 of the crankshaft 10, the screw 8 is tightened by inserting a respective tool through the receiving member 4.

The disc 7 provides a counter abutment for the bearing bushing 5, and the other axial abutment is formed, for example, by the shoulder 11 of the crank shaft 10. Axial play is provided between the bearing bushing 5 and the axial abutments, thus position-securing the clutch cup 1 with play on the crankshaft 10.

The centrifugal member 12 is fixedly connected to the crankshaft 10 and is surrounded by the clutch drum 2.

The hollow receiving member 4 engages the correspondingly shaped end of the drive shaft 13 to which the actual tool part is connected. The drive shaft 13 may be flexible (elastic) or rigid (stiff).

Figure 2:
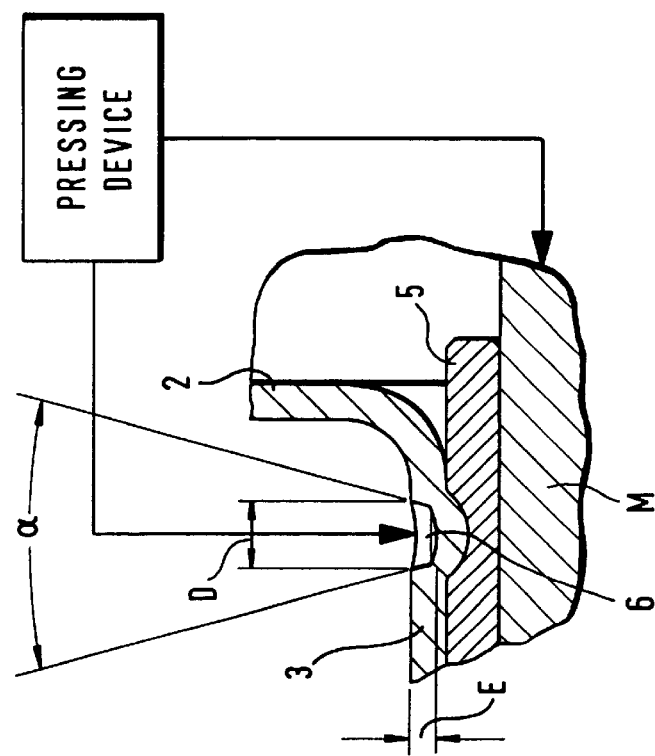
FIG. 2 shows an enlarged detail of FIG. 1 of one impression showing the calibration mandrel inside the bearing bushing.

FIG. 2 shows a detail of the hub 3 and of the bearing bushing 5 with an impression 6 in the shape of a truncated cone depression in an enlarged representation. The diameter D of the truncated cone depression is approximately 3 mm, the cone angle α is approximately 30° and the penetration depth E is approximately >0.5 mm. The positive-locking interlocking of the hub 3 and of the bearing bushing 5 by the impression 6 can be easily seen. Of course, the impression 6 is not limited to the shown shape. It can also be pointed, semispherical, cylindrical or any other similar and suitable shape or can also be a circumferentially extending groove that extends about the circumference of the hub completely or only partially. Also, the impressions 6 can be arranged on one or more circumferential circles of the hub 3. In this manner, different applications and use scenarios of the hand-held working tool can be taken into consideration.

FIG. 3 shows the clutch cup 1 with the screw 8 and the bearing bushing 5 to be inserted in a perspective exploded view. This illustrates the simple mounting on a pressing device that has additional tools (such as the calibrating device and the redressing device). Also, the final mounting step realized with the single screw 8 is illustrated. The screw 8 can be tightened by accessing the screw 8 through the hollow receiving member 4.

The inventive clutch cup 1 is part of a centrifugal clutch of a hand-held working tool, for example, a trimmer. It functions as follows:

After starting the internal combustion engine, the centrifugal member 12 connected to the crankshaft 10 will rotate. In the range of low rpm of the internal combustion engine the follower jaws of the centrifugal member 12 are secured by springs so that no torque-transmitting action between the centrifugal member 12 and the clutch drum 2 is realized. When surpassing a certain rpm, the centrifugal force overcomes the spring force so that the follower jaws will come into contact with the surrounding clutch drum 2 and entrain it. In this manner, the drive shaft 13 inserted into the receiving member 4 is rotated and thus also the tool connected thereto. When the engine rpm is lowered, the aforementioned sequence of steps is reversed so that the tool will be stopped.

The specification incorporates by reference the disclosure of German priority document 297 13 920.7 of Aug. 5, 1997.

The present invention is, of course, in no way restricted to the specific disclosure of the specification and drawings, but also encompasses any modifications within the scope of the appended claims.

What is claimed is:

1. A clutch assembly (1) for a centrifugal clutch of a hand-held working tool driven by an internal combustion engine, said clutch assembly (1) comprising:

a clutch drum (2);

a hub (3) coaxially formed with said clutch drum (2);

a bearing bushing (5) arranged in said hub (3) and fastened to said hub (3) by a frictional and positive locking connection (6);

a receiving member (4), coaxially formed with said hub (3), for receiving a drive shaft (13);

said clutch drum (2), said hub (3), and said receiving-member (4) being formed as a monolithic deep-drawn part;

said hub (3) having radially extending, circumferentially arranged impressions (6) pressed into said bearing bushing (5);

said bearing bushing (5) cooperating with axial abutments for position-securing said clutch cup (1) with play;

said bearing bushing (5) being configured for receiving a crank shaft (10) having a shoulder (11) forming a first one of said axial abutments, said bearing bushing (5) being adapted for contacting said shoulder (11) and also being adapted for contacting a securing member forming a second one of said axial abutments for said bearing bushing (5).

2. A clutch assembly (1) according to claim 1, wherein said impressions (6) are circumferential grooves or part-circumferential grooves or a depression point.

3. A clutch assembly (1) according to claim 1, wherein said impressions are depression points that are pointed, semispherical, or cylindrical.

4. A clutch assembly (1) according to claim 1, wherein said impressions (6) are arranged on one or more circumferential circles of said hub (3).

5. A clutch assembly (1) according to claim 4, wherein said impressions (6) are arranged in pairs, wherein said impressions of each one of said pairs are positioned opposite one another on one of said circumferential circles.

6. A clutch assembly (1) according to claim 4, wherein said impressions (6) are spaced at an angle of 120° on said circumferential circle.

7. A clutch assembly (1) according to claim 1, wherein said impressions (6) are shaped as a truncated cone having a diameter at a bottom of said truncated cone of 3 mm, a cone angle of 30°, and a depth of penetration into said hub (3) of >0.5 mm.

8. A clutch assembly (1) according to claim 1, wherein said impressions (6) are formed during pressing of said bearing bushing (5) into said hub (3).

9. A clutch assembly (1) according to claim 1, wherein said securing member is a screw (8) that is threaded coaxially in the end of the crankshaft (10).

10. A clutch assembly (1) according to claim 9, wherein said receiving element (4) is configured to provide access for tightening said screw (8).

* * * * *